INVENTOR
GEORGE S. JAMES

United States Patent Office 3,625,666
Patented Dec. 7, 1971

3,625,666
METHOD OF FORMING METAL-COATED DIAMOND ABRASIVE WHEELS
George S. James, Johannesburg, Transvaal, Republic of South Africa, assignor to Industrial Distributors (1946) Limited, Johannesburg, Transvaal, Republic of South Africa
Filed June 16, 1969, Ser. No. 833,628
Claims priority, application Republic of South Africa, June 19, 1968, 68/3,910
Int. Cl. B24b *1/00;* B24d *3/02*
U.S. Cl. 51—295
2 Claims

ABSTRACT OF THE DISCLOSURE

The working zone of an abrasive tool is formed from nickel-coated diamond particles and a runny epoxy resin. The mixture of diamonds and resin are charged into a mould. Settling out of diamond particles is prevented and the distribution of the particles in the runny resin is controlled by applying a magnetic field or an electrostatic field across the mould. The direction of the lines of field force is chosen to be normal to the eventual working face so that elongated particles tend to align themselves axially along lines of force.

---

Figure 1:
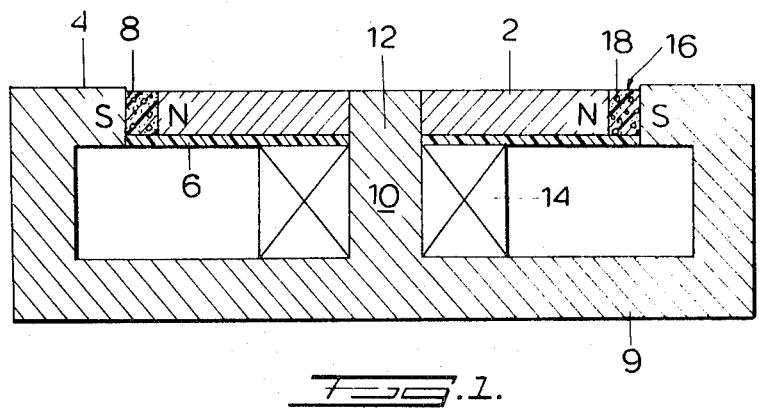

This invention relates to the manufacture of abrasive bodies.

It is well known to manufacture abrasive bodies by mixing a solid sinterable material such as thermosetting resin, with abrasive particles and sintering the resultant mixture under heat and pressure to form a hardened matrix supporting the abrasive grains.

In a prior proposal (British patent specification 760,526) it has been proposed to subject diamond particles to an electrostatic field with a view to orienting them in a metal matrix.

In this specification and in the appended claims the term "field" used without any qualification means a magnetic field or an electrostatic field.

However, it has not been possible to date to form a diamond containing abrasive body with a hardenable liquid matrix due to settling of the diamond particles in the liquid matrix during setting. It has thus not been possible to utilise materials, such as initially liquid and especially two-component resins, which in other respects would be particularly suitable for use as matrix forming materials in abrasive article manufacture.

It is therefore an object of the invention to provide a method of forming an abrasive body from a hardenable liquid resin containing diamond particles, in suspension in which the distribution of the particles in the liquid matrix can be controlled and maintained during hardening.

According to the invention a method of forming an abrasive body of diamond particles dispersed in a hardened matrix, consists in the steps of confining in a moulding space a runny, hardenable material with metal coated diamond particles dispersed therein; causing a field to traverse the moulding space, the field and the metal coating being so chosen that the field controls and maintains the distribution of the particles in the material; and causing or allowing the material to solidify, the field being applied until the material has set.

The field may be an electrostatic field or a magnetic field and in the latter case the metal coating is of a metal which is attracted to a magnetic pole, i.e. of a para or ferro magnetic material.

Thus the particles are retained in position in the moulding space by virtue of the field that acts on them. Settling from the material is thus inhibited or substantially prevented if the field strength is correctly chosen.

The runny material may be a hardenable liquid resin such as an epoxy resin to which a suitable hardening agent has been added. The invention is also applicable to the case where the runny material is a hardenable paste of relatively low viscosity in which the particles will otherwise settle over the hardening period.

If any of the diamond particles are elongated, it is possible to orientate these diamond particles axially by passing a field through the moulding space which has its lines of force in the desired direction of orientation. Normally this direction will be normal to the eventual working face.

The invention also provides that opposed sides of the moulding space are shaped with opposed asperities so that lines of the field force are concentrated between the asperities and the particles align themselves along the field concentrations with an appropriate axial alignment with elongated particles.

Figure 2:
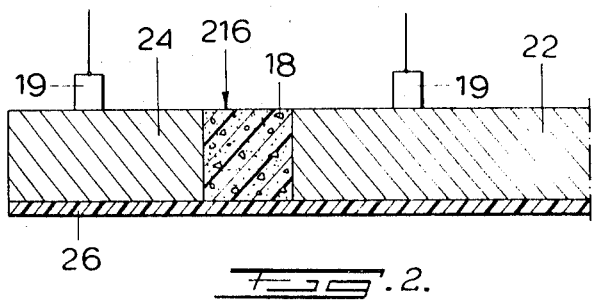
Figure 3:
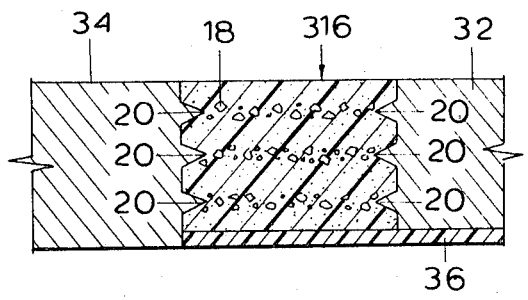

The invention is further described with reference to the accompanying drawing in which FIG. 1 is a section through apparatus for making an abrasive wheel, FIG. 2 is a half section similar to FIG. 1 of a different embodiment, and FIG. 3 is an enlarged section view of a moulding space of still another embodiment.

In FIG. 1 a circular base 2 of magnetisable material on which an abrasive body is to be formed to provide an abrasive wheel, is supported concentrically within an annular pole piece 4 on a plate 6 of non-magnetisable material. The periphery of the base 2 forms with the plate 6 and the annular pole piece 4 an annular channel 8.

The annular pole piece 4 is connected, by a cup-shaped yoke 9 of magnetisable material, to a central pole piece 10 which extends through an aperture 12 in the plate 6 and the circular base 2. A coil 14 wound around the central pole piece 10, when connected to a source of electrical current gives rise ot a radial magnetic field across the annular channel 8.

The channel 8 constitutes a moulding space which is charged with a suitable mixture. Thus the channel 8 may be charged with a mixture of an epoxy resin with a suitable hardener and an appropriate filler mixed in and nickel-coated diamond particles. The resin chosen is liquid at the operating temperature. In the drawing the coated diamond particles are indicated at 18.

The viscous liquid is thoroughly mixed with the particles 18 and then poured or worked into the channel 8, and simultaneously or immediately thereafter, current is fed to the coil 14 to create the magnetic field across the channel 8.

Initially, some of the magnetic-coated diamond particles may move under the influence of the magnetic field, toward the annular pole piece 4 and others toward the periphery of the base 2. The remaining diamond particles tend to be distributed along the magnetic lines of force and will now be concentrated between the diamonds adjacent the magnetic poles. Moreover all the coated diamond particles are orientated with their longer dimensions radial to the circular base 2, i.e. normal to the peripheral surface of the base 2. The diamond particles are maintained in their positions in the liquid for as along as the magnetic field is maintained.

The magnetic field is maintained until the resin has set and thereafter the magnetic field is switched off and the formed abrasive body removed from the mould.

While in the illustrated embodiment, the abrasive body is bonded to the base to form an integral abrasive article, it will be realised that, by using a hardenable liquid which is bondable only to the diamond particles and not to the base, the abrasive body may be formed as a separate element which thereafter may be applied to an appropriate base. Obviously mould release agents may be coated on appropriate surfaces.

In FIG. 2 an annular moulding channel 216 is defined between a base 22 of metallic material, and outer ring 24 also of metallic material and a plate 26 of insulating material. Electrodes 19 enable the elements 22 and 24 to be connected to a suitable source of high voltage.

Once more the channel 216 is charged with a liquid resin into which metal-coated diamond particles have been thoroughly mixed. In this case thetre is no need for the coating to be magnetic but a magnetic coating such as nickel will still be suitable.

FIG. 3 illustrates in an exaggerated way a method by means of which one can influence the distribution of the abrasive particles. Here a moulding cavity 316 is defined between elements 32 and 34 on a suitable base 36. The elements 32 and 34 may be magnetic pole pieces as in FIG. 1 or electrodes as in FIG. 2.

The essential feature is that the elements are provided on their opposed faces with opposed asperities 20. The asperities may be ribs, raised portions of screw threads, knurls or simple cones projecting from the elements, depending on the pattern of distribution that is required.

Whichever of the two fields is used, lines of force will be concentrated more strongly between opposed asperities 20. In the result particles in a liquid resin in the cavity 316 will tend to arrange and align themselves between pairs of asperities more or less as illustrated by the particles 18. In practice there need not be a complete end to end arrangement, but the alignment is sufficient to say that there is a controlled distribution of particles through chosen zones of the finished product.

Additives for further enhancing the properties of the abrasive body may also be added to the liquid matrix. Thus graphite may be added to increase the lubricity of the abrasive body. Aluminium powder may be added to increase strength and thermal conductivity and various granular materials may be added to increased friability or otherwise alter or influence mechanical properties.

I claim:

1. A method of forming an abrasive wheel comprising an annulus of diamond particles dispersed in a hardened matrix, consisting in the steps of dispersing metal coated diamond particles in a liquid epoxy resin mixture including a hardener for the resin, the particles being coated with a paramagnetic material; confining the mixture with metal coated diamonds in a horizontal annular moulding space between a member defining a magnetic north pole and a member defining a magnetic south pole; causing a magnetic field to traverse radially the annular moulding space horizontally between said poles to maintain the distribution of the particles in the mixture; and allowing the mixture to solidify, the field being applied until the mixture has set.

2. The method claimed in claim 1 in which opposed sides of the moulding space are shaped with opposed asperities so that lines of the field force are concentrated between the asperities and particles arrange and align themselves between the asperities.

References Cited

UNITED STATES PATENTS

| | | | |
|---|---|---|---|
| 3,073,732 | 1/1963 | Hunsdiecker | 264—24 |
| 3,098,401 | 7/1963 | Breeze | 264—24 |
| 3,125,418 | 3/1964 | Wentorf | 51—309 |
| 3,518,068 | 6/1970 | Gillis | 51—295 |

DONALD J. ARNOLD, Primary Examiner

U.S. Cl. X.R.

51—298, 309